Nov. 10, 1942.  A. E. LARSEN  2,301,417
ROTATIVE WINGED AIRCRAFT
Filed April 29, 1939  3 Sheets-Sheet 1

INVENTOR
Agnew E. Larsen
BY
Lynnstvedt + Lechner
ATTORNEYS

Nov. 10, 1942.   A. E. LARSEN   2,301,417
ROTATIVE WINGED AIRCRAFT
Filed April 29, 1939   3 Sheets-Sheet 2
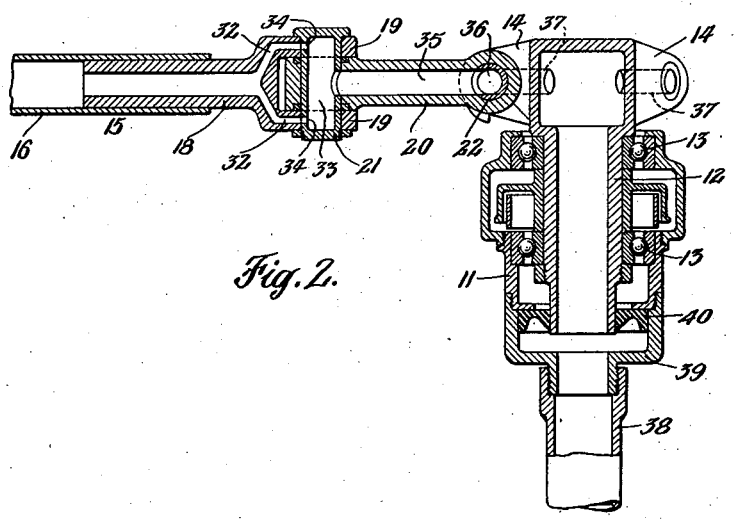
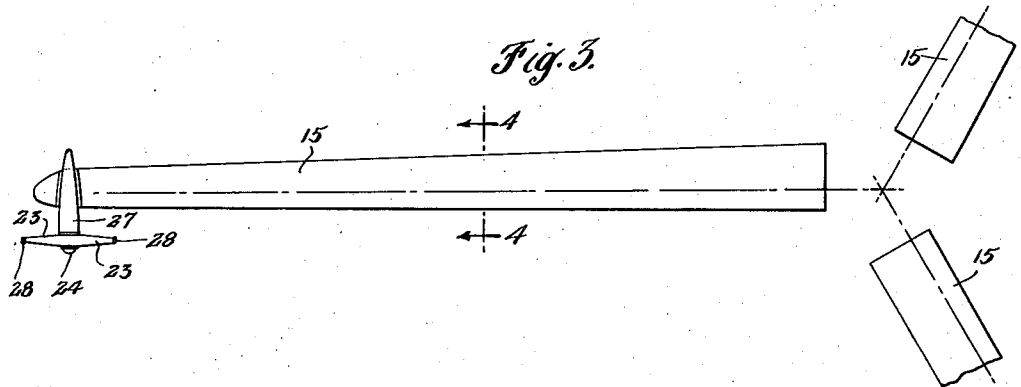
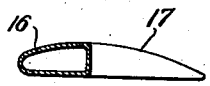
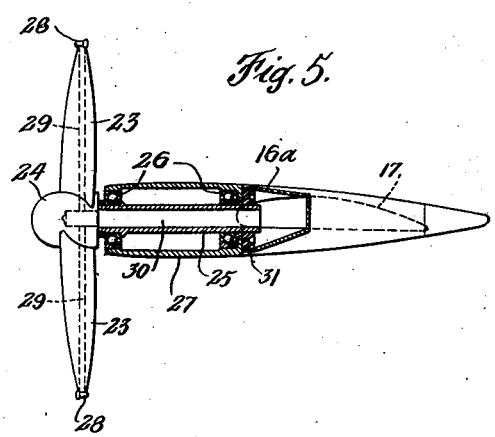
INVENTOR
Agnew E. Larsen
BY
ATTORNEYS Nov. 10, 1942.   A. E. LARSEN   2,301,417
ROTATIVE WINGED AIRCRAFT
Filed April 29, 1939   3 Sheets-Sheet 3

INVENTOR
Agnew E. Larsen
BY
Synnestvedt + Lechner
ATTORNEYS

Patented Nov. 10, 1942

2,301,417

UNITED STATES PATENT OFFICE 2,301,417

ROTATIVE WINGED AIRCRAFT

Agnew E. Larsen, Jenkintown, Pa., assignor to Autogiro Company of America, Willow Grove, Pa., a corporation of Delaware Application April 29, 1939, Serial No. 270,715

2 Claims. (Cl. 244—17)

This invention relates to rotative winged aircraft, and is especially concerned with aircraft of this type in which rotor drive means are provided setting up no appreciable driving reaction in the body, thereby enabling helicopter flight with a single rotor, without necessitating the provision of any means for counteracting torque.

One of the primary objects of the invention is the provision of a drive system of this character for the sustaining or lifting rotor, which system has greatly improved efficiency as compared with previously proposed non-reactive types of drive.

The foregoing general object, and also others mentioned hereinafter as the description proceeds, is accomplished by mounting a driving airscrew on a blade of the lifting rotor, preferably adjacent the tip thereof, and by employing jet propulsion means for actuating the driving airscrew. As compared with the known type of jet drive, in which the jet devices are mounted on the blades of the rotor to provide direct driving reaction, the system of the present invention is very much more efficient, for the reason that the practicable operating speeds of a lifting rotor, particularly if autorotation for descent is contemplated, are relatively low and in the range of rotor blade tip speeds in which jet devices are highly inefficient. In accordance with the invention, the jet devices are applied adjacent to the tips of the airscrew or airscrews mounted on the rotor blade, such airscrew having relatively high R. P. M. providing an airscrew blade tip speed lying within the range in which high efficiency of jet propulsion is obtainable.

On the other hand, as compared with the known driving system in which a mechanical drive is extended from an engine in the body of the machine through the hub and throughout the length of the rotor blades to driving airscrews mounted at the tips, the present invention is highly advantageous in making possible the elimination of such mechanical driving connections, the structural and operational problems of which are very severe.

Still further, the arrangement of the present invention compares very favorably with that known type of drive in which an engine is carried by the rotor blade itself and connected with an airscrew for effecting rotation of the rotor. The problem of constructing a rotor blade capable of withstanding the loads and stresses arising from centrifugal force acting on the outboard engine is virtually insurmountable. In addition, the mass of an outboard engine would probably prevent or at least excessively restrict flapping movement of the blade, and probably would also prevent autorotational operation.

In addition to the specific points mentioned above, the prior known types of drive are also subject to numerous other disadvantages which are overcome by the present invention, as will be more apparent in the following description.

The drawings illustrate two forms of the invention. In the drawings—

Figure 2 is an enlarged vertical sectional view of the rotor hub and the root end mounting of a blade thereon;

Figure 3 is a top plan view of portions of the rotor of Figures 1 and 2 on a reduced scale;

Figure 4 is an enlarged sectional view of one of the rotor blades taken as indicated by the line 4—4 on Figure 3;

Figure 5 is an enlarged sectional view taken axially of the shaft for mounting the airscrew on the rotor blade, the view also including certain parts in elevation;

Figure 1:
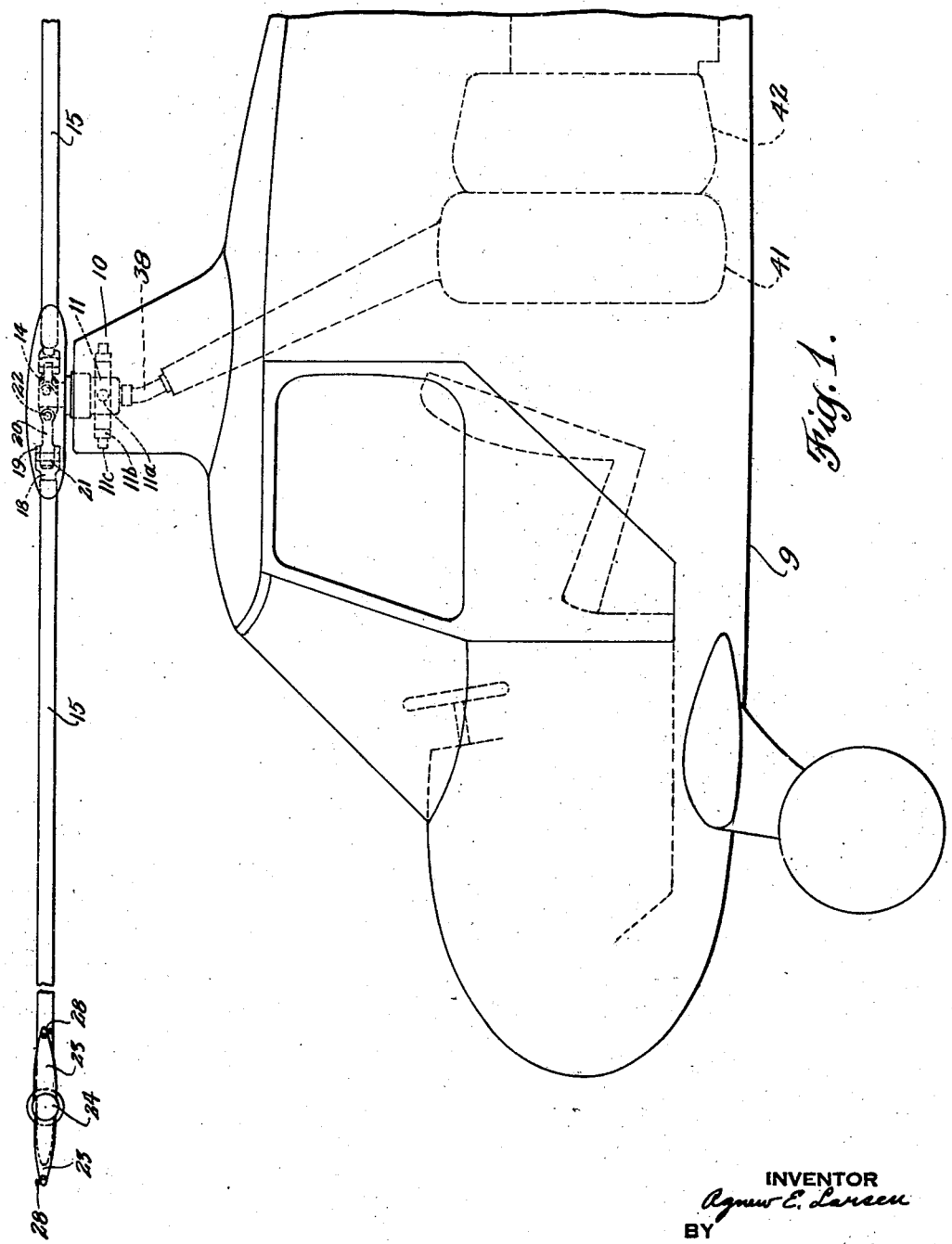
Figure 1 is a side outline view of the forward portion of an aircraft having a rotor and rotor drive constructed in accordance with the invention.

Referring first to the form of Figures 1 to 5 inclusive, the body of the aircraft is indicated in Figure 1 at 9, the rotor being mounted above the body in any suitable manner, as by means of structural elements lying within the streamlined sheath 10.

As best seen in Figure 2, the rotor hub incorporates an external non-rotative mounting portion 11 serving to journal the internal rotative hollowed hub member 12 by means of bearings 13—13. The upper end of the rotative hub member 12 projects above the mounting structure 11 and is provided with pairs of apertured lugs 14, one pair for each of the blades of the rotor, three blades being included in the form illustrated, as will be apparent from inspection of Figure 3. Each blade 15 incorporates a longitudinal tubular member 16 preferably disposed to define the nose portion of the blade and serving as the primary longitudinal structural element thereof (see Figure 4). The trailing edge portion 17 of the blade may be built up and mounted on the nose tube 16 in any desired manner, which need not be considered in detail herein. Toward its inner end, the tube 16 is connected with a centrally hollowed fitting 18 having a pair of opposed and apertured lugs 19—19 receiving the extension link 20 and connected therewith by means of a pivot pin 21. The extension link, in turn, is connected with one pair of lugs 14—14 of the hub by means of a pivot 22.

While the axes of pivots 21 and 22 may be disposed at other angles, in the form shown herein the pivot 21 has its axis extended generally vertically, and the pivot 22 is disposed with its axis extended generally horizontally and perpendicular to the longitudinal axis of the blade. Insofar as most features of the invention are concerned, any one of a variety of forms of blade mountings may be adopted, although, preferably, at least one pivotal mounting is employed having its axis positioned so that at least a component of pivotal movement of the blade is in a direction transverse the mean rotative path of travel of the blade.

As seen in Figures 1, 3 and 5, adjacent the tip of each blade there is mounted a driving airscrew having blades 23—23 which extend from a hub 24 mounted on shaft 25 which, in its turn, is rotatively mounted by bearings 26 in a casing 27, the casing being carried by and secured to the blade tube member 16 which constitutes the primary longitudinal structural element of the blade, said tube having its nose portion opened and flared as at 16a adjacent to the airscrew, in order to cooperate with the bearing housing 27.

The tip of each blade 23 of the driving airscrew carries a jet nozzle 28 which is adapted to discharge fluid under pressure delivered thereto through passages 29—29 formed in the blades 23. These passages 29 communicate with a central passage 30 formed in the mounting shaft 25 and hub 24 of the airscrew, the rear end of passage 30 being in communication with the interior of the blade tube 16, as clearly appears in Figure 5. A packing ring 31 provides a fluid-tight connection between the opening in the tube 16 and the external surface of mounting shaft 25 for the airscrew.

Toward its inner end, the tube 16 is in communication with the internal passage of fitting 18 (see Figure 2) which latter has branch passages 32—32 extended into the lugs 19—19 and communicating with the central chamber 33 in the pivot pin 21 as by ports 34. The chamber 33, in turn, is in communication with a passage 35 formed in the extension link 20, and in its turn this passage 35 is connected with a central bore 36 in the pivot pin 22. Passages 37 formed in blade mounting lugs 14 connect the bore 36 with the interior of the rotative hub member 12, the lower end of which is adapted to receive the fluid under pressure from a conduit 38 through the chamber provided in the lower closure member 39 for the hub structure. A sealing ring 40 is disposed between the closure 39 and the external surface of hub spindle 12.

In the arrangement illustrated (see Figure 1), the source of fluid under pressure takes the form of a compressor 41 driven by an engine 42, the compressor delivering to the conduit 38, as shown.

For purposes of control, the hub casing 11 may be pivotally mounted by means of transverse trunnions 11a in a gimbal ring 11b which, in its turn, may be mounted on fixed structure by means of longitudinal trunnions 11c. The conduit 38 may either be flexible or provided with one or more flexible joints, so as to provide freedom for tilting movement of the hub on its gimbal ring mounting in all directions, to secure controlling moments, in the general manner disclosed in copending application of Juan de la Cierva, Serial No. 645,985, filed December 6, 1932.

With regard to the jet driving devices for the airscrew, it should be kept in mind that insofar as the broader aspects of the invention are concerned, any desired type of jet propulsion device may be employed. For instance, the jet system may be of the explosion type instead of the type acting directly from a source of fluid under pressure as shown herein. The system shown, however, has advantages, among which might be mentioned the fact that the engine and compressor may conveniently be located in the body of the machine and the fluid pressure delivered therefrom through the hub and blade, and thence through the airscrew mounting shaft to the jets thereon.

In accordance with the foregoing, the invention provides a non-reactive drive system for a single rotor, said system having numerous advantages over other known systems of this type. The invention contemplates a lifting or sustaining rotor having a blade tip speed in the range of several hundred feet per second, for instance 500 or 600, which is desirable for a number of reasons, particularly where the rotor is capable of autorotation under certain flight conditions, such as descent without power. As hereinabove indicated, blade tip speeds in this range afford only very low efficiency of propulsion where jet propelling devices directly react to drive the blade. Therefore, the invention contemplates use of the driving airscrew and operation of such airscrew at a rate providing a tip speed in a substantially higher range than that of the rotor blades, for example, in the neighborhood of 1000 feet per second, although this speed may vary as much as several hundred feet per second. Notwithstanding the fact that the jet reaction is only indirectly transmitted to the blade, the efficiency of the drive system of the present invention is materially higher than that of a system employing jets directly reacting to drive the rotor in the range of rotor blade tip speeds above referred to.

The type of blade structure incorporating a tube defining the nose part of the blade is of advantage since this tube serves not only as the primary structural element of the blade, but also as a passage for the fluid from the hub to the outboard propeller. Still further, this type of blade structure is of advantage in facilitating the provision of an effective and secure mounting for the axis member of the airscrew.

By the use of fluid passages formed in the blade mounting pivots and within the hub, the invention eliminates all external conduits or flexible tubes on the blades and makes possible location of the source of fluid under pressure in the body of the machine.

Figure 6:
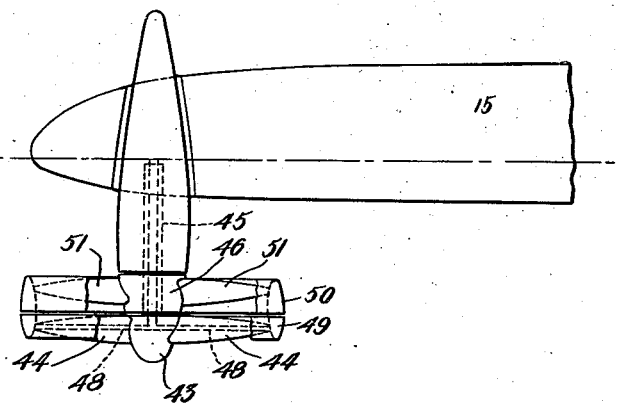
Figure 6 is a top plan view of a portion of a rotor blade with a modified airscrew driving arrangement mounted thereon.
Figure 8:
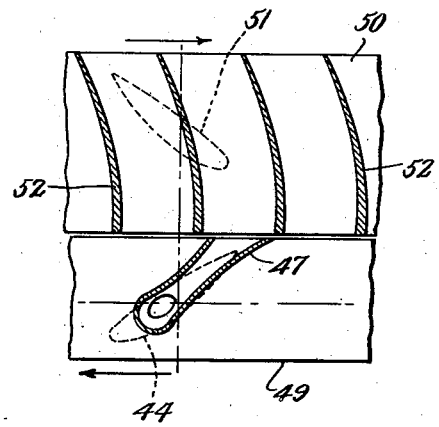
Figure 8 is a sectional view taken substantially as indicated by the line 8—8 on Figure 7.
Figure 7:
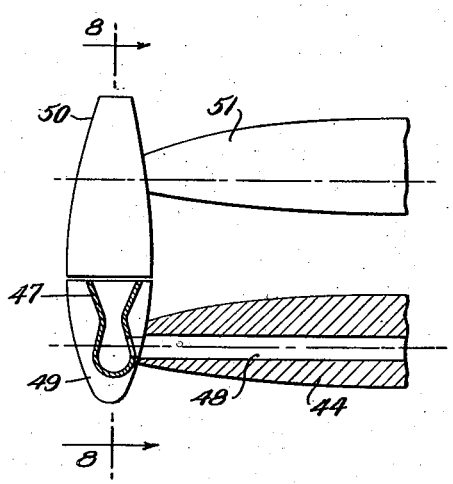
Figure 7 is an enlarged view, partly in plan and partly in section, of portions of the airscrew drive mechanism shown in Figure 6.

Various advantages of the invention may also be secured in the modified airscrew arrangement of Figures 6, 7 and 8 in which, instead of employing a single airscrew, each blade 15 preferably carries a pair of tandem coaxial oppositely rotating airscrews. As seen in Figure 6, the forward airscrew comprises a hub 43 with a pair of blades 44—44 extended therefrom, the hub 43 being mounted as by means of a shaft 45 which may be journalled similarly to the arrangement described above (see Figure 5). The hub 46 of the other airscrew may be mounted for free rotation on the shaft 45.

In this tandem system, the fluid is delivered to jet devices 47 provided at the tips of blades 44 of the forward airscrew, internal passages 48—48 serving to feed the jets, in the manner described with reference to the arrangement of Figures 1 to 5. From inspection of Figures 6, 7 and 8 it will be seen that the jets 47 are arranged in a ring 49 lying adjacent to and ahead of a ring 50 which is carried by the tips of blades 51—51 of the rear propeller. The two ring members 49 and 50 together have a streamlined cross-sectional shape, as clearly appears in Figures 6 and 7.

Within the ring 50 a multiplicity of impeller blades 52 are arranged, these blades being curved and positioned after the fashion of turbine practice and arranged to receive fluid discharged from the jet nozzles 47. In this way a portion of the jet energy which would otherwise be dissipated is utilized to drive the rear propeller blades 51, this drive being in a direction opposite to that of blades 44, the direction of rotation of each propeller being indicated by arrows in Figure 8.

As will readily be appreciated, various features of the invention are applicable in a wide variety of situations and in a wide variety of rotor types. The rotor may obviously incorporate any desired number of blades, and in a multi-bladed rotor the driving airscrews may be employed either on all blades or on any desired number thereof, providing only that the arrangement has proper static and dynamic balance.

I claim:

1. In an aircraft, a bladed sustaining rotor, a fluid pressure operable device mounted on a blade of the rotor for effecting rotation thereof, a source of fluid pressure in the body of the craft, a hub structure to which said blade is pivotally connected, the hub structure comprising an internal hollowed rotative part, an external cooperating non-rotative part, means connecting the interior of the internal hub part with said source of fluid pressure, and means interconnecting said driving device and the interior of the internal hub part to provide for transmission of fluid under pressure from the source to the driving device, said last means including a hollowed pivot pin serving as the pivotal mounting for the blade on the hub.

2. For a bladed aircraft sustaining rotor having an outboard airscrew for rotating the rotor, fluid pressure means for effecting rotation of said airscrew, a source of fluid pressure in the body of the aircraft, and mechanism for mounting a rotor blade and for delivering fluid from said source in the body of the aircraft to said means for effecting rotation of the airscrew, the mechanism last mentioned comprising a hollowed rotative hub part and a pivotal connection between the blade and said hub part including a pair of cooperating mounting members apertured to receive a pivot pin serving to interconnect said members with freedom for pivotal movement, each of said members further being provided with a passage for fluid under pressure and the passages in said pair of members being interconnected through said pivot pin.

AGNEW E. LARSEN.